United States Patent

[11] 3,597,728

[72] Inventor Anthony D. Kurtz
 901 N.W. 47th St., Lawton, Okla. 73501
[21] Appl. No. 736,164
[22] Filed June 11, 1968
[45] Patented Aug. 3, 1971

[54] MEANS OF INSTANTLY DETECTING ANOMALIES ON A MOVING VEHICLE
 5 Claims, 3 Drawing Figs.
[52] U.S. Cl. .................................................. 340/52,
 180/97, 200/52, 200/153.12, 280/94, 280/268
[51] Int. Cl. ...................................................... B60q 1/00
[50] Field of Search .......................................... 33/203,
 203.18; 180/6.2, 82, 97; 280/88, 94, 268; 200/52,
 153.12; 340/52

[56] References Cited
UNITED STATES PATENTS
1,954,938  4/1934  Lozonne ........................ 340/52
2,624,123  1/1953  Wilkerson ...................... 340/52
2,672,597  3/1954  Ritch, Jr. ....................... 340/52

Primary Examiner—John W. Caldwell
Assistant Examiner—J. Michael Bobbitt
Attorney—Lucke & Lucke ABSTRACT: This application discloses a new method and means for instantly ascertaining any deviation from the normal toe-in, toe-out alignment of any vehicle's front wheels, regardless of make or model, domestic or foreign, all wheel or front-wheel drive. This valuable information is derived from detecting any maladjustment of the specified adjusted angle between the tie rod and the steering arm at the precise point of adjustment and causing an indicator lamp on the instrument panel to light whenever such misalignment occurs.

The device operates by means of a microswitch contact arm having a roller wheel at its free end. When the front wheels are in a straight ahead position and alignment is normal, the roller rides in a groove in an operating rod which is pivotally attached at one end to a fixed pivot mount on a steering arm. If the adjusted angle between the tie rod and the steering arm deviates from its original correct adjustment, the roller is displaced from its groove, forcing the contact arm upwardly to close the normally open microswitch. This in turn lights a lamp on the instrument panel to indicate that the left and/or the right wheel is toeing in or out in excess of specifications.

PATENTED AUG 3 1971
3,597,728
SHEET 2 OF 2
FIGURE 2
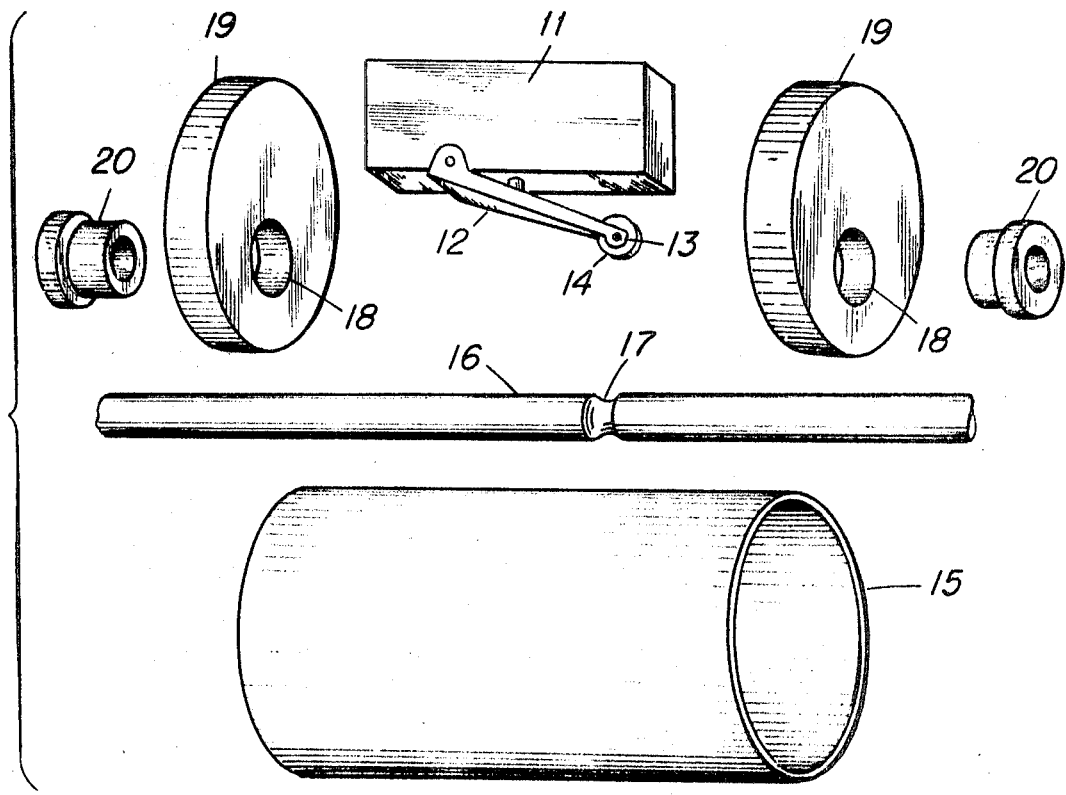
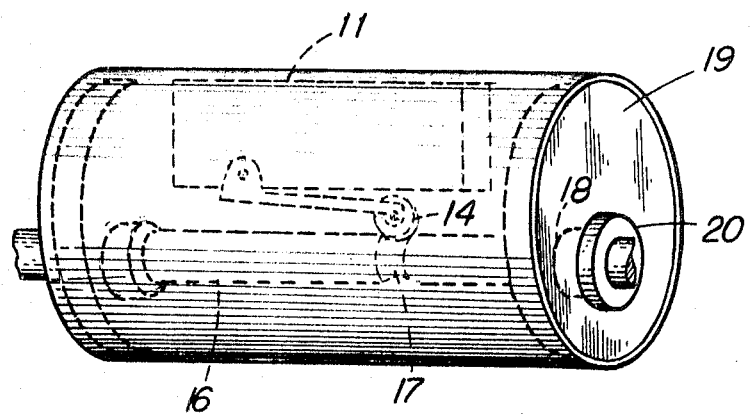
FIGURE 3
INVENTOR.
Anthony D. Kurtz
BY Lucke + Lucke 3,597,728

MEANS OF INSTANTLY DETECTING ANOMALIES ON A MOVING VEHICLE

BACKGROUND OF THE INVENTION

1. Field of the invention

This invention relates to devices which detect toe-in or toe-out misalignment of vehicular front wheels and relays information of such irregularity to an indicator within view of the driver.

2. Description of the prior art

All steering geometry is based upon angular measurements of caster, camber, king-pin or ball-joint axis inclination and the toe-in, toe-out relationship of front wheels with the base line or initial measurement axis being the vehicle center line from front to rear, and vertical planes either parallel to or at right angles to such base line.

Known devices which purport to indicate faulty camber or other anomalies of steering geometry are engineering monstrosities which are not only impractical, but impossible to install in modern cars. A study of prior patents shows that attempts to detect and/or measure front end discrepancies in caster, camber and toe-in have been impractical in that they are affected by too many other mechanical factors, such as king-pin or ball-joint wear, heat distortion of brake shoe backing plates, wear or deterioration of front suspension members (upper or lower support arms) and by excessive exposure to road spray or splash, flying gravel and debris thrown up by the front wheels. The device herein disclosed is not adversely affected by any of these mechanical factors.

Previously patented devices require that the vehicle be stationary for sensing or measurement of misalignment. They are characterized by complex and cumbersome calibration procedures which require disassembly and minute adjustment of delicate components. The instant invention requires no dismantling at any stage of installation or servicing.

SUMMARY OF THE INVENTION

The instant invention is the first practical, economical and operative wheel misalignment detector known. It operates by sensing deviations from the established critical angle between the tie rod and the steering arm of each front wheel when the steering gear is in the straight ahead position. This detector operates under two conditions, with the vehicle either in motion or stationary. The microswitch is actuated by lateral motion of a sliding operating bar or rod which passes through the device closing the microswitch whenever left or right motion of the steering gear occurs, thus energizing a left or right indicator light bulb on the instrument panel.

An 18-second-time delay relay is introduced into the lamp circuit to eliminate intermittent lighting of the bulbs and/or continuous flashing which would otherwise occur during normal process of steering. With the time delay relay installed in the circuit, the lighting of either or both bulbs signifies actual misalignment conditions.

BRIEF DESCRIPTION OF THE DRAWINGS

Further features and advantages of the invention will be apparent in the following detailed description and accompanying drawings which illustrate preferred embodiments of the invention, wherein:

FIG. 2 is a disassembled view of the several components which form the device shown in FIG. 1; and FIG. 3 is an elevational view of the device shown in FIGS. 1 and 2, illustrating the manner of mounting the microswitch and operating bar within the housing.

DESCRIPTION OF THE PREFERRED EMBODIMENT

Figure 1:
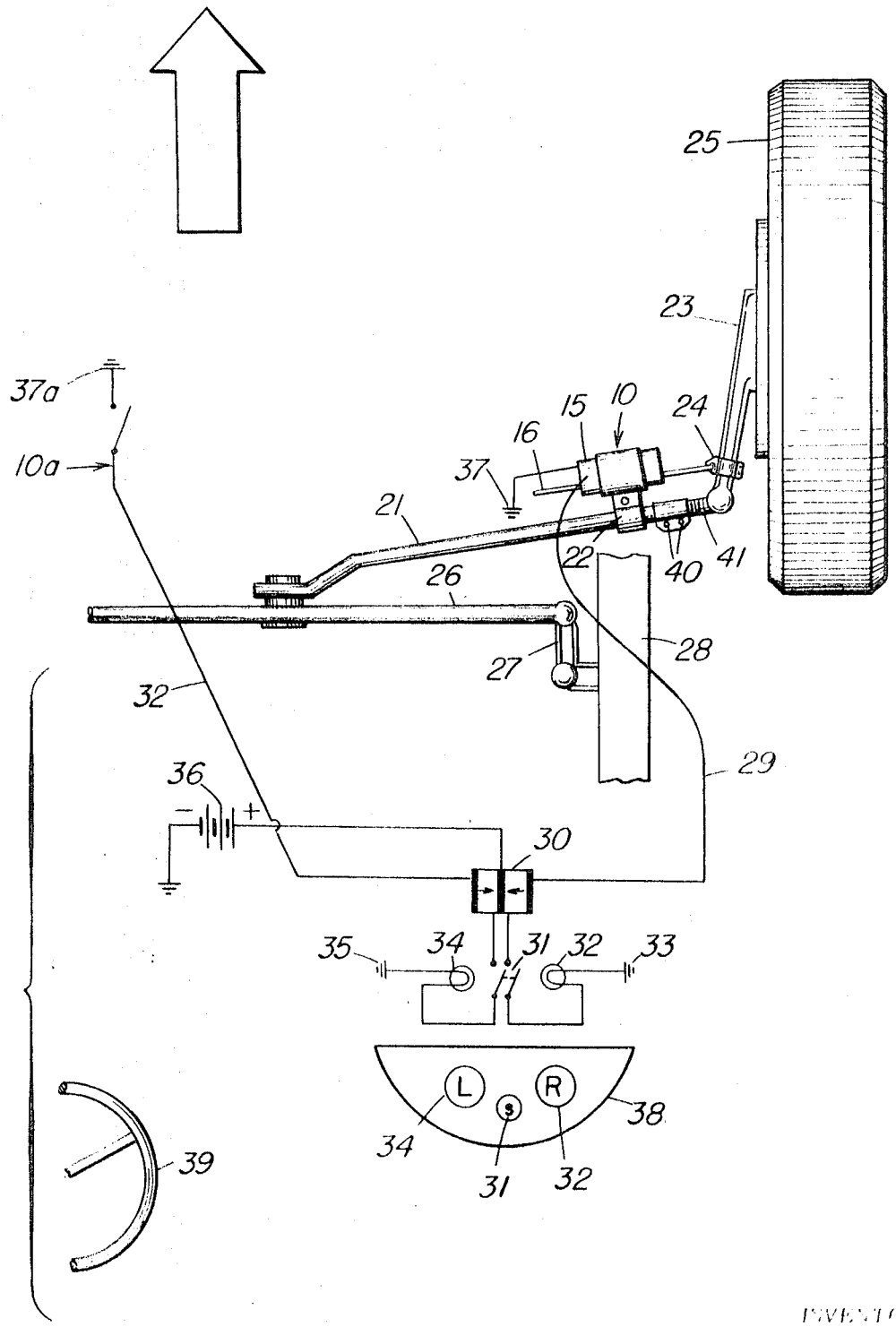
FIG. 1 is a plan schematic view of a wheel misalignment detecting device attached to and mounted upon a conventional tie rod and having its operating bar pivotally attached to the steering arm of the right front wheel.

Referring now to the drawings, FIG. 1 illustrates basic steering gear components in relation to the vehicle frame and the right front wheel which is facing in a forward direction as indicated by the arrow.

As previously stated, it is imperative that the front wheels be properly aligned before detector units forming this invention are installed thereon, as the elemental function of said units is to signal toe-in, toe-out deviations from such correct alignment of either or both said front wheels.

The detector device as an assembly is designated 10 in FIG. 1 and the various elements thereof are shown in disassembled attitude in FIG. 2. A microswitch 11 bears a contact arm 12 with its free dependent end 13 mounting a roller 14. The microswitch is mounted against the top inner surface of a cylindrical housing 15 so as to position the roller at a midpoint of the long axis of the housing, as shown in FIG. 3. An operating rod or bar 16 with a transverse machined groove 17 passes longitudinally through housing 15 via apertures 18 bored in end plugs 19. Teflon bushings 20 are press fitted into the apertures so as to form an effective moisture seal for the housing enclosure and to furnish a tight sealing, antifriction bearing surface for the operating bar 16. Groove 17 is disposed at the center of the housing to receive roller 14 when the wheels are straight, and thereby open microswitch to its normal "off" position.

Whenever the operating bar is moved left or right during normal steering motions, the roller is lifted out of the machined groove and rides along the greater diameter of the bar to actuate the microswitch to its "on" position. It is at this point that the operating tolerance is designed into the device, with plus or minus 0.003 inches considered as optimum deviation of the transverse groove from the radius dimension of the microswitch roller.

The fixed end of the operating bar is attached to a steering arm so that when the front wheels are in the straight ahead position the normal "off" attitude of the microswitch is maintained and when the wheels are turned left or right the microswitch is actuated to a closed or "on" attitude. Similarly, if a maladjustment exists which disrupts the critical angular relationship of the tie rod with the steering arm, the microswitch will be actuated to "on" with the vehicle wheels in the straight ahead position. The critical angle existing between the tie rod and the steering arm referred to is a function of the basic toe-in, toe-out specification designed into the vehicle by the manufacturer, and it is this essential angular relationship which is constantly being monitored by the detector device.

Suitable fabricating materials include 16 gage aluminum tubing of 2 inch OD for the housing 15; ⅜ inch brass plate plugs machined to fit the open ends of the housing, bored to accommodate a pair of Teflon bushings 20 and the operating bar 16. The bar is fabricated of 5/16 inch steel drill rod.

As shown in FIG. 1, the detector assembly housing 15 is mounted directly to the tie rod 21 as by a clamp 22. The outboard end of operating bar 16 is pivotally affixed to a steering arm 23 by a clamp assembly 24 of the front right wheel 25. Conventional mounting of steering gear components are shown with the tie rod 21 attached to a relay rod 26, which in turn is suspended via an idler arm 27 from a frame member 28.

An electric cable 29 connects the microswitch 15 through a time delay relay 30 to an option switch 31. One cable runs from the option switch to a right-hand signal lamp 32 which is grounded as at 33. A similar electrical connection is made from the detector 10a on the left-hand wheel (not shown) to the time delay relay, to the option switch and a left-hand signal lamp 34 grounded as at 35. The electric current is supplied by a battery 36 through the circuit designated 29 to the various components. Both detecting devices are grounded as indicated at 37, 37a, see FIG. 1.

The option switch which may be three way, i.e., with or without delay and off positions, may be turned on at any time during a straight stretch of the road that the driver wishes to check the alignment of the front wheels. This is especially desirable after hitting a curb, depression or other hard object too fast. If damage has occurred to the right wheel, signal lamp 32 on the instrument panel 38 will light up. If the left wheel has been affected, signal lamp 34 will light and both lamps will light if both wheels have been knocked out of alignment.

In operation, starting with a correctly aligned front end, housing assembly 15 is clamped to tie rod 21 with front wheels in the dead ahead position so that roller 14 will drop into groove 17 of operating bar 16, which is the normal "off" position of the microswitch 11. It will be seen that any movement of the steering gear by the steering wheel 39 will cause lateral movement of operating bar 16, lifting roller 14 and actuating microswitch 11 to its closed or "on" position. This sends an impulse signal to time delay relay 30 via cable 29 causing indicator light 32 to burn. If switch 31 is left open, the light will not burn. This switch provides the driver with the option of having the device operative or inoperative while driving the vehicle under normal conditions.

Should excessive toe-in or toe-out be noted, corrective action involves only the loosening of the tie rod adjustment sleeve locking bolts 40 and the rotation of the threaded adjustment sleeve 41, either right or left, until the indicator light is extinguished showing that correct alignment has been effected. Locking bolts 40 are then retightened. There is no need to open housing 15 or to perform any adjustment functions on the detection device in the course of realigning. As assistant is usually needed to observe the indicator panel to inform the mechanic if the light is on or off. The use of a temporarily connected test light attached to the cable terminal (not shown) on the housing will also serve the same purpose.

The device forming this invention senses misalignment of toe-in or toe-out only. This is the element of steering geometry which is more often affected by road shock or minor damage due to striking curbs, chuck holes in pavement or collisions involving the front end mechanism. This is due to the fact that the tie rods and steering arms are of lighter construction than the components which govern and control caster, camber and steering axis inclination, i.e., the upper and lower support arms and bushings, and the ball joint or king pin assemblies are rarely if ever affected by impact or shock.

It will be seen that the primary purpose of this device is to increase road safety providing the driver of an automobile with an instantaneous indication, during normal operation or when parked, that the front end alignment of his vehicle is not within specifications. This information is of vital importance in that such detrimental conditions cause unnecessary and costly wear to front tires due to tread scrub and side slippage with resultant overheating which may cause blowouts and highway accidents.

Depending upon tire size, wheel radius and other factors of front end geometry, one-fourth inch of misalignment can cause up to 50 feet of side slip per driven mile. This much excess toe-in or toe-out can reduce tire life by one-third or more. Literally, millions of dollars are lost annually because motorists are unaware that such conditions exist.

This device poses no calibration problem. The installation procedure embodies only a bolt-on operation which may be installed by a relatively untrained mechanic with only rudimentary hand tools. The basic positioning of the device requires only that it be secured in place with the "normal off" microswitch circuit open as evidenced by unlighted indicator panel lights. The system is readily adaptable to and imposes no inordinate current load on basic automotive electrical circuitry.

Not only does the instant device provide a completely unique advantage to an owner driver in maintaining a safe, roadworthy vehicle, but if misalignment is indicated, such maladjustment may be corrected by any person of minimal mechanical skill and training by the application of routine adjustment procedures to the tie rod length adjustment sleeve 41 on either or both tie rod ends until proper alignment is shown by the indicator light going "off."

Most experts and specialists in the field of wheel alignment consider that the preponderance of steering and malalignment problems in present day automobiles are to be found in the area of toe-in, toe-out adjustments. Seldom do serious troubles occur in caster, camber or steering axis inclination unless the front portion of the vehicle has sustained heavy damage, either by dropping as from a service jack, or by road collision. These experts attest that correction by adjustment of improper toe-in and toe-out conditions will very often alleviate other misalignment factors, and vice versa, which proves most forcefully the interdependence of all factors of steering geometry. In any event, early detection and the application of immediate procedures to correct defective or improper toe-in, toe-out conditions is of paramount importance in the proper maintenance of safe and correct steering alignment and the elimination of unwarranted tire wear.

The forms of the invention here described and illustrated are presented merely as examples of how the invention may be embodied and applied. Other forms, embodiments and applications of the invention, coming within the proper scope of the appended claims, will of course suggest themselves to those skilled in the art.

What I claim is:

1. For use on any conventional four wheel vehicle having steerable front wheels, tie rods, pivotal steering arms, a common electric power source, an instrument panel and an electric circuit connecting said source to said panel, a front wheel misalignment detecting device comprising a housing clamped parallel to a first of said tie rods, a microswitch rigidly mounted in said housing and connected to said circuit, said microswitch provided with a contact arm and a roller carried by said contact arm, an operating bar passing longitudinally through said housing, one end of said bar being pivotally affixed to a first of said steering arms, said steering arm connected to the outboard end of said first tie rod, a transverse groove disposed substantially intermediate the length of said operating bar, said roller adapted to ride in and out of said groove to open and close said microswitch each time said bar passes in either direction through said housing, wherein said roller maintains said microswitch in normally open position each time it drops into said groove.

2. A device according to claim 1, wherein said housing is provided with two open ends, plugs for closing said open ends, aligned apertures disposed proximate a lower edge of said end plugs and means for sealing said housing and forming a bearing surface for said bar.

3. A device according to claim 2, wherein Teflon bushings form said sealing means and said bearing surface, said bushings being mounted upon said bar and press fitted into said apertures.

4. A device according to claim 1, including a time delay relay installed in said circuit, an option switch and two signal lamps mounted on said panel, said option switch connecting said lamps to said microswitch through said relay, whereby said microswitch is closed to light at least one of said lamps when said option switch is closed and at least one of said wheels is out of alignment.

5. A device according to claim 4, including a three way option switch for bypassing said time delay relay.